United States Patent [19]

Sensen et al.

[11] Patent Number: 5,135,689
[45] Date of Patent: Aug. 4, 1992

[54] METHOD OF MEASURING THICKNESS OF EXTRUDED FILMS

[75] Inventors: Klemens Sensen, Lengerich; Werner Feistkorn, Saerbeck, both of Fed. Rep. of Germany

[73] Assignee: Windmoller & Holscher, Lengerich, Fed. Rep. of Germany

[21] Appl. No.: 676,573

[22] Filed: Mar. 28, 1991

[30] Foreign Application Priority Data

Mar. 28, 1990 [DE] Fed. Rep. of Germany ....... 4009982

[51] Int. Cl.$^5$ .............................................. B29C 47/92
[52] U.S. Cl. .................................. 264/40.2; 264/564; 425/141; 425/326.1
[58] Field of Search ...................... 264/40.1, 40.2, 564; 425/135, 141, 326.1; 324/699

[56] References Cited

FOREIGN PATENT DOCUMENTS 2505221 8/1976 Fed. Rep. of Germany ...... 425/141
952644 8/1982 U.S.S.R. .......................... 264/40.2

Primary Examiner—Leo B. Tentoni
Attorney, Agent, or Firm—Fleit, Jacobson, Cohn, Price, Holman & Stern

[57] ABSTRACT

For measuring thickness of films of synthetic thermoplastic which have been solidified but not yet fully cooled after extrusion, a capacitive measuring head is moved into contact with the film and during a measuring cycle is moved over the surface of the film in the area in which the measurement is to be effected. The measuring head is disengaged from the film after each measuring cycle. To ensure that the measurement will not be affected by a temperature rise of the measuring head during a measuring cycle, the measuring head is moved into contact with the film before the measuring cycle begins and the measuring cycle is not initiated until a time has elapsed in which the measuring head has assumed a temperature which remains substantially constant throughout the measuring cycle.

3 Claims, 2 Drawing Sheets

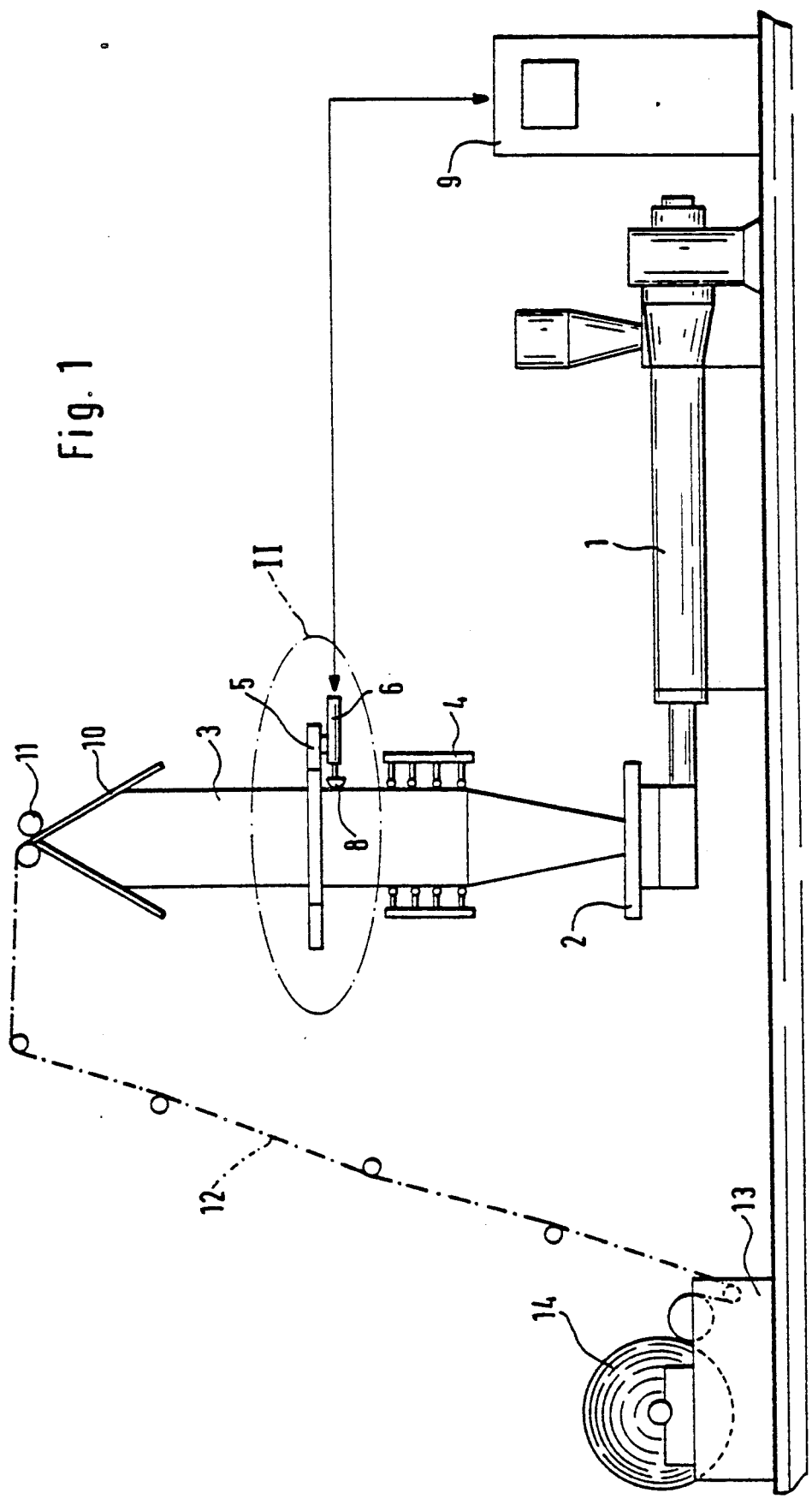

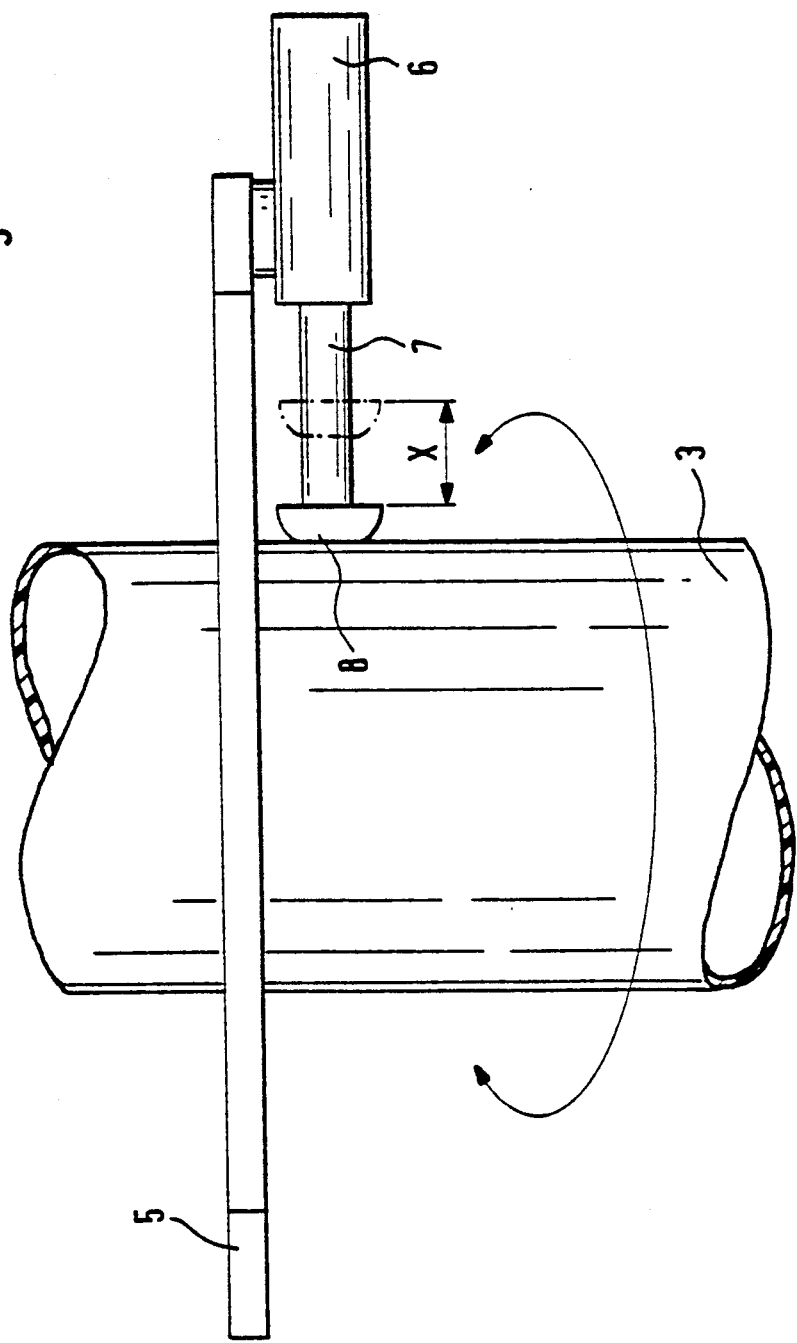

METHOD OF MEASURING THICKNESS OF EXTRUDED FILMS

BACKGROUND OF THE INVENTION

1. Field of the Invention

This invention relates to a method of measuring the thickness of films of synthetic thermoplastic which have been solidified but have not yet fully cooled after they have been extruded, for example in extruding and film-blowing plants, in into contact with the film and during a measuring cycle is moved over the surface of the film in an area in which the measurement is to be effected and the measuring head is disengaged from the film after each measuring cycle.

2. Description of the Prior Art

The thickness of extruded films, particularly of tubular films made in extruding and film-blowing plants, may be measured particularly in order to detect the actual values and to process them for a control or automatic control of the production process in such a manner that deviations of the thickness of the produced film from the mean film thickness will be avoided.

Capacitively acting measuring heads for measuring the thickness of films are known, e.g., from prior German Patent Application P 40 02 155.6.

A conventional method which serves to measure the wall thickness of tubular films produced in extruding and blow-molding plants will be described with reference to the drawings.

A tubular film made from molten synthetic thermoplastics is extruded in known manner from an annular-passage die of a film-blowing head 2, (FIG. 1) which is preceded by an extruder 1. By means not shown, the tubing which has been extruded out of the blow head 2 is subsequently cooled and blown to form a film bubble 3, which is supported by sizing means 4 above the so-called frost line. A rotary deck 5 is provided above the sizing means 4 and a piston-cylinder unit 6 is secured to the rotary deck 5. A capacitive measuring head 8 is fixed to the piston 7 of the piston-cylinder unit 6 and during each measuring cycle is moved into contact with the film bubble 3. At that time, the rotary deck 5 begins to rotate through 360 degrees, the capacitive measuring head measures the wall thickness of the film bubble around its periphery and the thickness profile is displayed by a display unit 9. After a rotation through 360 degrees has been performed within about 2 to 3 minutes the capacitive measuring head 8 is retracted by as distance designated X in FIG. 2. The measuring head 8 then remains in its retracted position for about 15 to 20 seconds, whereafter it is again advanced to contact the film for another measuring cycle.

It will be understood that the sizing means and the rotary deck 5 are secured to frame parts which are not shown. The machine frame is also provided with rotatably mounted draw-off and pinch rolls 11, which define a nip, in which the tubular film, received from flattening plates 10 is flattened. The flattened tubular film 12 is then trained around guide rollers to move to a winder 13, in which the flattened tubular film is wound up to form a roll 14.

The extruding and film-blowing plant and the measuring method which have been described thus far ar of known type and for this reason need not be described in more detail.

The described method of measuring the wall thickness of the film bubble 3 has the disadvantage that in the region which is disposed above the sizing means 4 and in which the measuring is to be effected, the film bubble has not yet entirely cooled down, but still has a mean temperature of about 60 to 100° C. whereas the ambient temperature is about 25 to 30° C. As a result, the measuring head which has been retracted to its initial or stand-by position will cool during the time until it is moved into contact with the film bubble for the next measuring cycle. When the measuring head is then moved to contact the film and the rotary deck begins to rotate immediately thereafter for the measurement, the temperature of the measuring head will progressively increase during the rotation through 360 degrees and owing to that progressive temperature rise will indicate different measured values even when the film of the bubble has a constant thickness. Such result is due to both ohmic and geometric influences resulting from the different temperature conditions which are due to the progressive temperature rise of the measuring head during a measuring cycle.

SUMMARY OF THE INVENTION

It is an object of the invention to provide a method of the kind described in which the measurement is not affected by a temperature rise of the measuring head during a measuring cycle.

In accordance with the invention, the measuring head is moved into contact with the film before the measuring operation proper begins and the measuring cycle is not initiated until a time has elapsed in which the measuring head has assumed a temperature which remains substantially constant throughout the measuring cycle.

BRIEF DESCRIPTION OF THE DRAWING

FIG. 1 is a diagrammatic side elevation showing an extruding and film-blowing plant, and FIG. 2 is a view showing on a larger scale the portion which is encircled in FIG. 1.

DESCRIPTION OF PREFERRED EMBODIMENT

In the method in accordance with the invention which may utilize the apparatus as described previously, the measuring head 8 is moved into contact with the film 3 that is to be measured and the measuring head remains in contact with the film prior to a measuring cycle until the head has been heated approximately to the temperature of the film, so that the measuring head will not be subjected during the measuring cycle, to a further temperature rise which would affect the result of the measurement. The measuring head does not deliver measured value signals during the heating-up time. The rotary deck 5 will only begin to rotate and the measuring cycle commence, when the measuring head has approximately reached the temperature of the film that is to be measured and measured-value signals are then delivered by the measuring head to the control or automatic control unit and to the display unit at the same time.

The time in which the measuring head is heated up before the beginning of each measuring cycle may amount to 5 to 15 seconds, preferably about 10 seconds.

I claim:

1. A method of measuring thickness of an extruded, synthetic thermoplastic film which is solidified and partially cooled comprising the steps of extruding molten synthetic thermoplastic into film form, moving a capacitive measuring head into contact with the film, moving said capacitive measuring head over a surface of the film during a measuring cycle and disengaging said capacitive measuring head from contact with the film after the measuring cycle, wherein the improvement comprises moving said capacitive measuring head into contact with the film for a time before beginning the measuring cycle in order to heat said capacitive measuring head to approximately film temperature, which temperature remains substantially constant through the measuring cycle and then commencing the measuring cycle by moving said capacitive measuring head over a surface of the film.

2. A method according to claim 1, wherein the time in which the measuring head is heated up in contact with the film before the measuring cycle is about 5 to 15 seconds.

3. A method according to claim 2 wherein the time is about 10 seconds.